United States Patent
Segev et al.

(10) Patent No.: US 12,436,877 B2
(45) Date of Patent: Oct. 7, 2025

(54) WRITE PROTECT HW ACCELERATION

(71) Applicant: Sandisk Technologies, Inc., Milpitas, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/488,426

(22) Filed: Oct. 17, 2023

(65) Prior Publication Data
US 2025/0123957 A1  Apr. 17, 2025

(51) Int. Cl.
*G06F 12/02* (2006.01)
*G06F 13/16* (2006.01)

(52) U.S. Cl.
CPC ........ *G06F 12/023* (2013.01); *G06F 13/1668* (2013.01)

(58) Field of Classification Search
CPC ............................ G06F 12/023; G06F 13/1668
See application file for complete search history.

(56) References Cited

U.S. PATENT DOCUMENTS

| | | | |
|---|---|---|---|
| 8,688,899 B2 * | 4/2014 | Nellans | G11C 11/40615 711/103 |
| 10,761,725 B2 | 9/2020 | Palmer | |
| 10,936,496 B2 * | 3/2021 | Simionescu | G06F 3/0656 |
| 11,455,402 B2 * | 9/2022 | Trantham | G06F 3/0659 |
| 2022/0283713 A1 | 9/2022 | Li et al. | |

FOREIGN PATENT DOCUMENTS

WO    2016050140 A1    4/2016

* cited by examiner

*Primary Examiner* — Hosain T Alam
*Assistant Examiner* — Subir Kumar Chowdhury
(74) *Attorney, Agent, or Firm* — Patterson + Sheridan, LLP

(57) ABSTRACT

Instead of the firmware (FW) monitoring for both an overlap read command and a write protected (WP) overlapped write command, the FW can monitor the overlap table only. The controller will receive a read command or an overlap read command. If the command is not an overlap read command, then the controller will process the command normally. If the command is an overlap read command, then the controller will look for the write command that is being overlapped. When passing the write overlap of write protect (WP) into the data path instead of the exception queue, the FW is limited to monitoring the overlap table. As such, when the WP command is completed the entry is removed by the data path. As a result, the FW can limit monitoring to when the data path clears the overlap table.

15 Claims, 8 Drawing Sheets

WRITE PROTECT HW ACCELERATION

BACKGROUND OF THE DISCLOSURE

Field of the Disclosure

Embodiments of the present disclosure generally relate to improving command processing when there is command overlap.

Description of the Related Art

Solid state devices (SSD) can support two different functionalities that impose a problem when put together. The first functionality references write-protect range. In some SSDs, some logical block addresses (LBA) range can be defined as write protected. The second functionality references overlap detection when SSDs handle read-overlap of writes.

For example when the host performs a read, followed by a write to the same range, the device needs to be aware of the write to avoid host writes LBA 10-20 and host reads LBA 15-20. The device should make sure that the host will not return (for the read command) LBA 16, 17 from the write, and LBAs 18, 19, and 20 from data in previous commands.

In another example when a read command 'A' overlaps a write command 'B', where the write command 'B' overlaps the write protect (WP) range 'C' the device needs to wait for command 'B' to complete to service command 'A'. However, command 'B' does not complete in the "normal path", but rather in exception path.

There is a need in the art for reducing the firmware (FW) overhead and unify the flow so that the FW monitors when the data path clears the overlap entry.

SUMMARY OF THE DISCLOSURE

Instead of the firmware (FW) monitoring for both an overlap read command and a write protected (WP) overlapped write command, the FW can monitor the overlap table only. The controller will receive a read command or an overlap read command. If the command is not an overlap read command, then the controller will process the command normally. If the command is an overlap read command, then the controller will look for the write command that is being overlapped. When passing the write overlap of write protect (WP) into the data path instead of the exception queue, the FW is limited to monitoring the overlap table. As such, when the WP command is completed the entry is removed by the data path. As a result, the FW can limit monitoring to when the data path clears the overlap table.

In one embodiment, a data storage device comprises: a memory device; and a controller coupled to the memory device, wherein the controller is configured to: retrieve an overlap read command; look for a write command that is overlapped with the read command; wait for the write command to be completed by a data path; and execute the read command.

In another embodiment, a data storage device comprises: a memory device; and a controller coupled to the memory device, wherein the controller includes: a control path having an overlap table, a classification module, an error queue, and a processor; and a data path having a direct memory access (DMA) module, a write queue having a write protect attribute, and a flash interface module (FIM), wherein the data path is configured to complete write commands and remove write commands from the overlap table.

In another embodiment, a data storage device comprises: means to store data; and a controller coupled to the means to store data, wherein the device is configured to: execute a write command with a write protect attribute; report the write command is completed with an error; remove the write command from an overlap table; and unblock execution of a read command.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of the firmware (FW) monitoring for both an overlap read command and a write protected (WP) overlapped write command, the FW can monitor the overlap table only. The controller will receive a read command or an overlap read command. If the command is not an overlap read command, then the controller will process the command normally. If the command is an overlap read command, then the controller will look for the write command that is being overlapped. When passing the write overlap of write protect (WP) into the data path instead of the exception queue, the FW is limited to monitoring the overlap table. As such, when the WP command is completed the entry is removed by the data path. As a result, the FW can limit monitoring to when the data path clears the overlap table.

Figure 1:
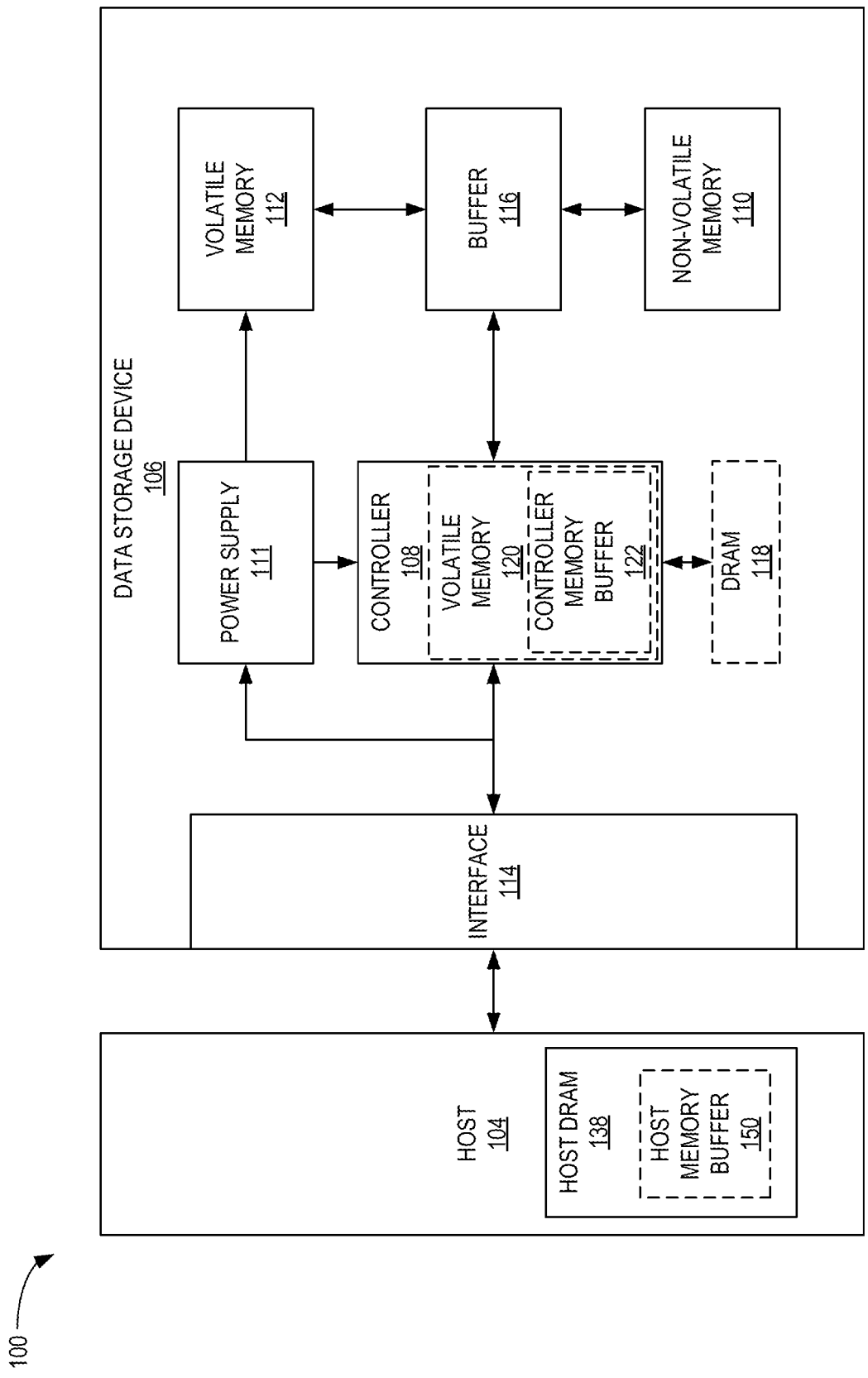
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
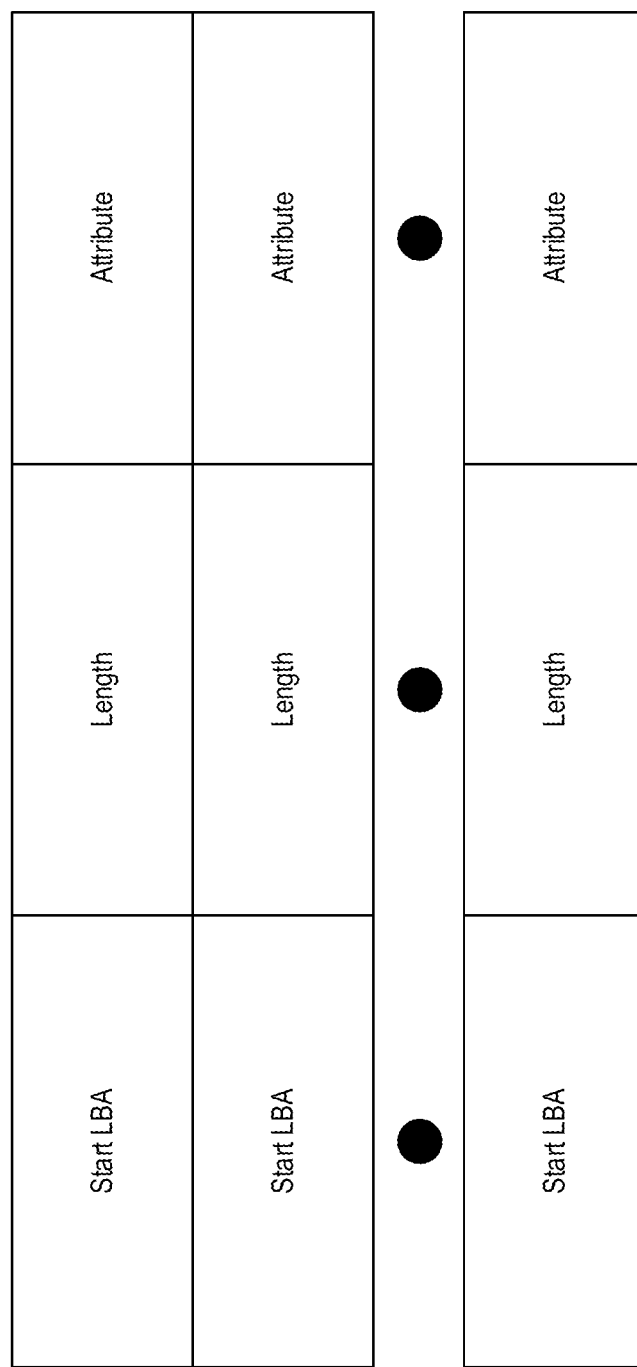
FIG. 2 is a block diagram illustrating an overlap table, according to certain embodiments.

FIG. 2 is a block diagram illustrating an overlap table 200, according to certain embodiments. Each entry in the overlap table 200 corresponds to a specific range of logical blocks (Start LBA to Start LBA+Length−1). Each entry holds different attributes, for example write-protected. When a command arrives, the drive looks at the overlap table 200. The drive will then detect an overlap and extract the attribute. The list of attributes can be very large (in some application like in eSS drives) as much as 4K entries long.

In addition, if the command is a write command, the write command is pushed into the database so newer commands will be able to be detected when the controller scans for overlaps. For a write protect flow, when the device receives a write command to mark a range of the data as write protect (WP), the device will add an entry with the relevant range. If a write command arrives to the write protect flow, the WP attribute will be set and the command will be sent to exception handling.

For read command flows, when a read command arrives, the controller will scan the overlap database and the controller might detect that there is an overlap with a "write command" or with a "write protect range". If the overlap is with a "write protect range", then the read command can be executed normally. If the overlap is with a "write command", then the device waits for the write command to complete to avoid the partial response provided in the earlier example.

Figure 3:
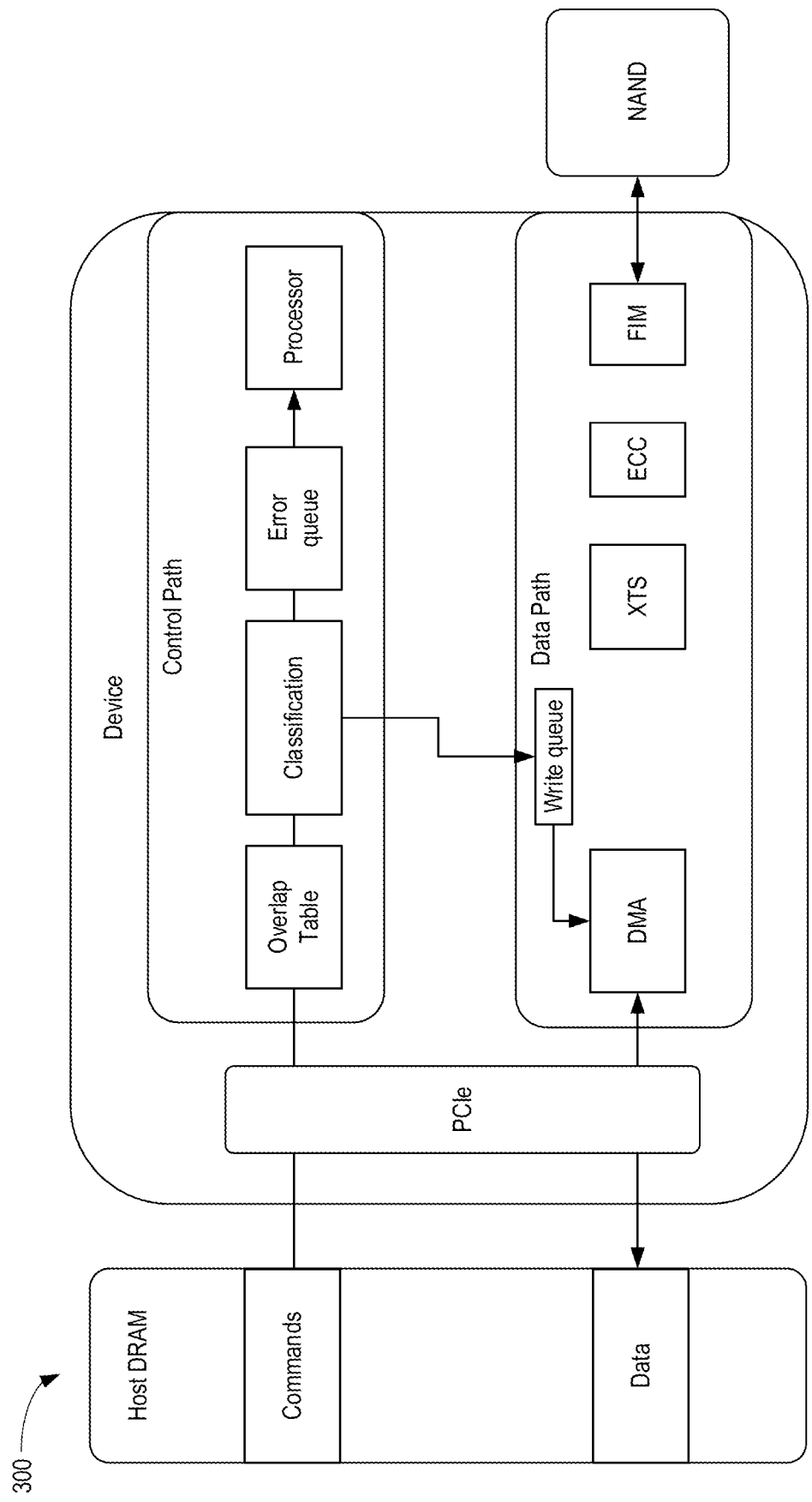
FIG. 3 is a block diagram illustrating a system for handing a write command, according to certain embodiments.

FIG. 3 is a block diagram illustrating a system 300 for handing a write command, according to certain embodiments. The system 300 comprises a host DRAM, a device (controller) and a NAND which is the source/destination for data. The host DRAM comprises a command module and data. The device comprises a PCIe which is the interface, a control path, and a data path. The control path further comprises an overlap table, a classification module, an error queue, and a processor. The processor handles read commands and commands with errors. In the current example, a write to a WP is an error command, so the processor handles the error command. The classification module will classify normal (even with overlap of other writes) write commands to the write queue.

The data path is built for bandwidth, and comprises a write queue to hold the write commands that needs to be executed, a direct memory access (DMA) to read data from the host DRAM, an XTS engine to encrypt the data, an error correction code (ECC) module to add data correction information, and a flash interface module (FIM) to write data to the NAND.

The system 300 is an idea of passing the write overlap of WP into the data path instead of the exception queue. As such, when the WP command completes the entry is removed by the data path. As a result, the firmware (FW) needs to monitor when the data path clears the overlap table. It is important to note that since the write to overlap area is considered an error, incurring a performance hit is acceptable.

When a read overlap occurs, the FW (processor) waits for the data path to remove the entry (of the write command) from the overlap table that caused the overlap when the write command completes. However, when a write command arrives to the exception queue due to WP, the read command cannot wait for the data path to clear the entry from the overlap table. The read command cannot wait, since the write command never reached the data path. As such, the FW needs to monitor two locations for releasing the overlap tables.

Figure 4A:
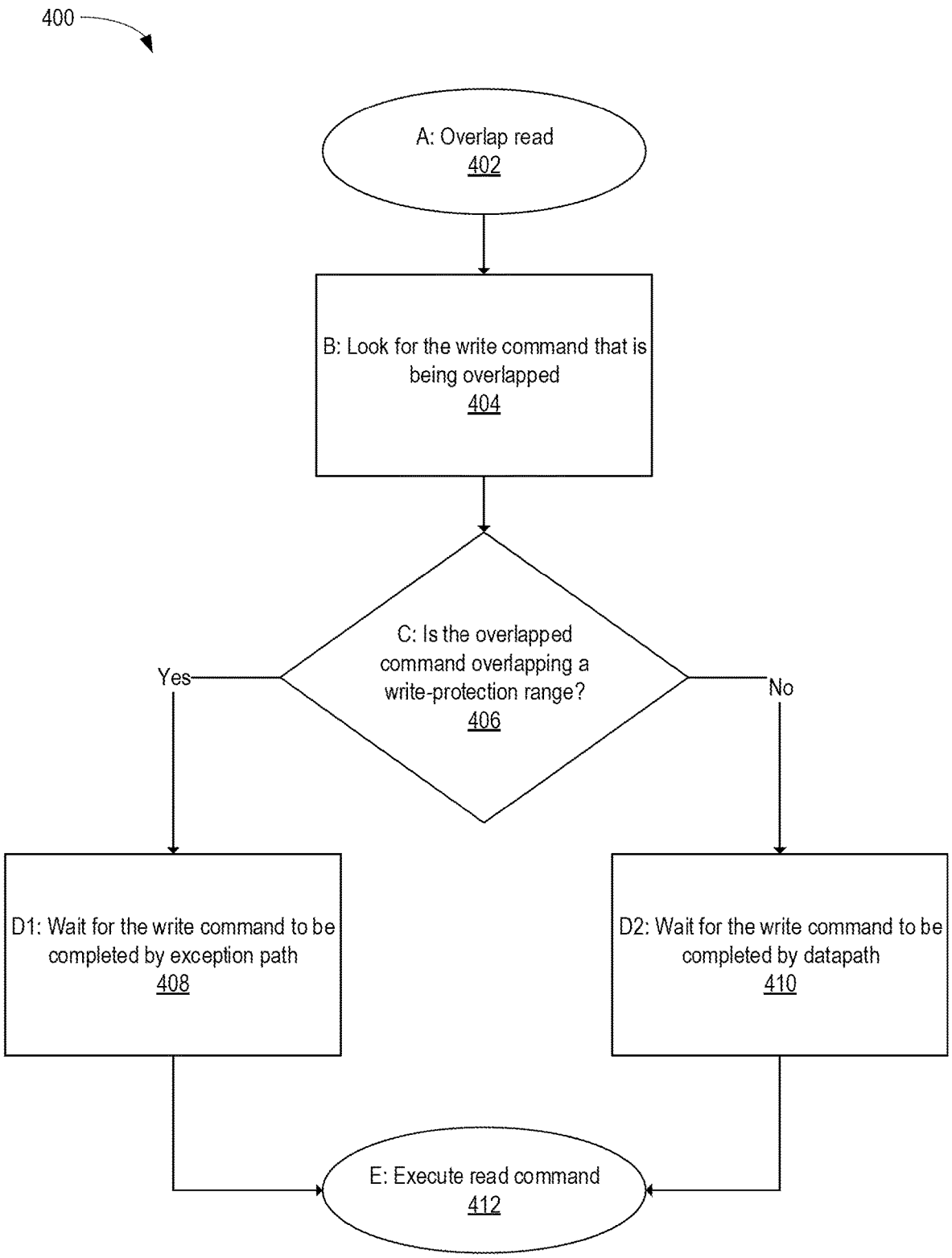
FIG. 4A is a flowchart illustrating a method for an overlap read command, according to certain embodiments.

FIG. 4A is a flowchart illustrating a method 400 for an overlap read command, according to certain embodiments. The controller detects when a command is received if there is an overlap. There are two different cases for detecting this overlap. The first case can be that the controller detects an overlap because the range is marked a write protected. In this case, when there is a write command to this range, the controller will not perform the write command. In another case if there is a read command doing an overlap to some command then, the controller determines the reason for the overlap. For example the data not being in the cache for the read command to read.

The method begins at block 402 (step A). At block 402, an overlap read is received by the controller. At block 404 (step B), the controller looks for the write command that is being overlapped. The firmware (FW) looks to understand which command is being overlapped. At block 406 (step C), the controller determines whether the overlapped command is overlapping a write-protection range. If the controller determines that the overlapped command is overlapping a write-protection range, then the method 400 proceeds to block 408 (step D1). The FW checks if the command found in block 404 happens to overlap the write-protected area. At block 408, the controller will wait for the write command to be completed by exception path. If the overlapped command is overlapping write-protect-range, the FW now waits for completion from the exception flow. If the controller determines that the overlapped command is not overlapping a write-protection range, then the method 400 proceeds to block 410 (step D2). At block 410, the controller will wait for the write command to be completed by data path. At block 412 (step E), the controller will execute the read command.

Figure 4B:
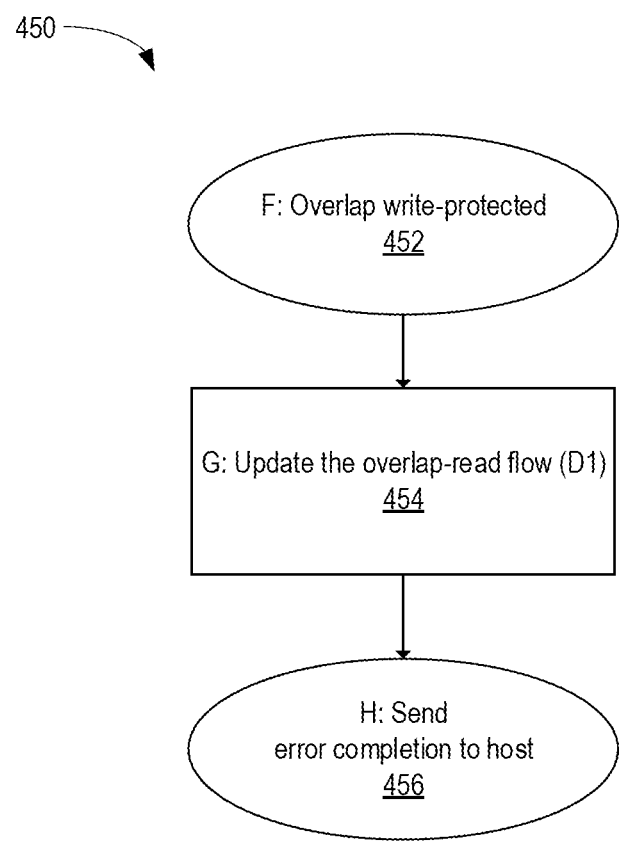
FIG. 4B is a flowchart illustrating a method for a write protected overlapped write command, according to certain embodiments.

FIG. 4B is a flowchart illustrating a method 450 for a write protected overlapped write command, according to certain embodiments. The method 450 begins at block 452 (step F). At block 452, the controller receives an over-write protected command. The write over WP range command arrives is queued to an exception queue as the over-write protected command overlaps a write-protected range. At block 454 (step G), the controller updates the overlap-read flow. The FW updates the read-overlap flow as to the completion of the over-write protected command. At block 456 (step H), the controller sends an error completion to the host. Step G, D1, and G exists because of the combination of the two flows (the method 400 and the method 450). Step G in particular happens even if the method 400 ends at step D2, and does not reach step D1. Step G affects "normal" overlap read commands also.

In another embodiment, when the controller receives an overlap read to a WP overlap write, then the controller will have a write command error. The controller will then try to read a command with a write error previously. The results would be either going to be the old write protected data or a failure because the controller won't return the new write command data.

A write command at step G will not happen because the write command reaches an exception queue. The controller has to wait for the removal of the write from the FW. The controller has to wait for step D1 (block 408) and in parallel in time is where the write is not overlapping the write protect range, the controller has to wait for the write to complete from the data path.

The controller monitors two different flows. The flow for the case where there is no overlap and the flow and for the case when there is overlap. Removal from the table 200 is done by two different entities. The problem is that the write command that overlaps the write protected range does not reach the data path. The overlap of the read has to monitor two different locations.

As will be discussed herein, reducing the FW overhead is valuable, and unifies the flow so that the FW only needs to keep looking when the data path clears the overlap entry. More specifically, the write overlap of the write protect is passed into the data path instead of the exception queue. As such, when the write command to a WP range completes, the entry will be removed by the data path. As a result, the FW needs to monitor only when the data path clears the overlap table. Because the write to the overlap area is considered an error, it is ok to incur a performance hit.

Figure 5:
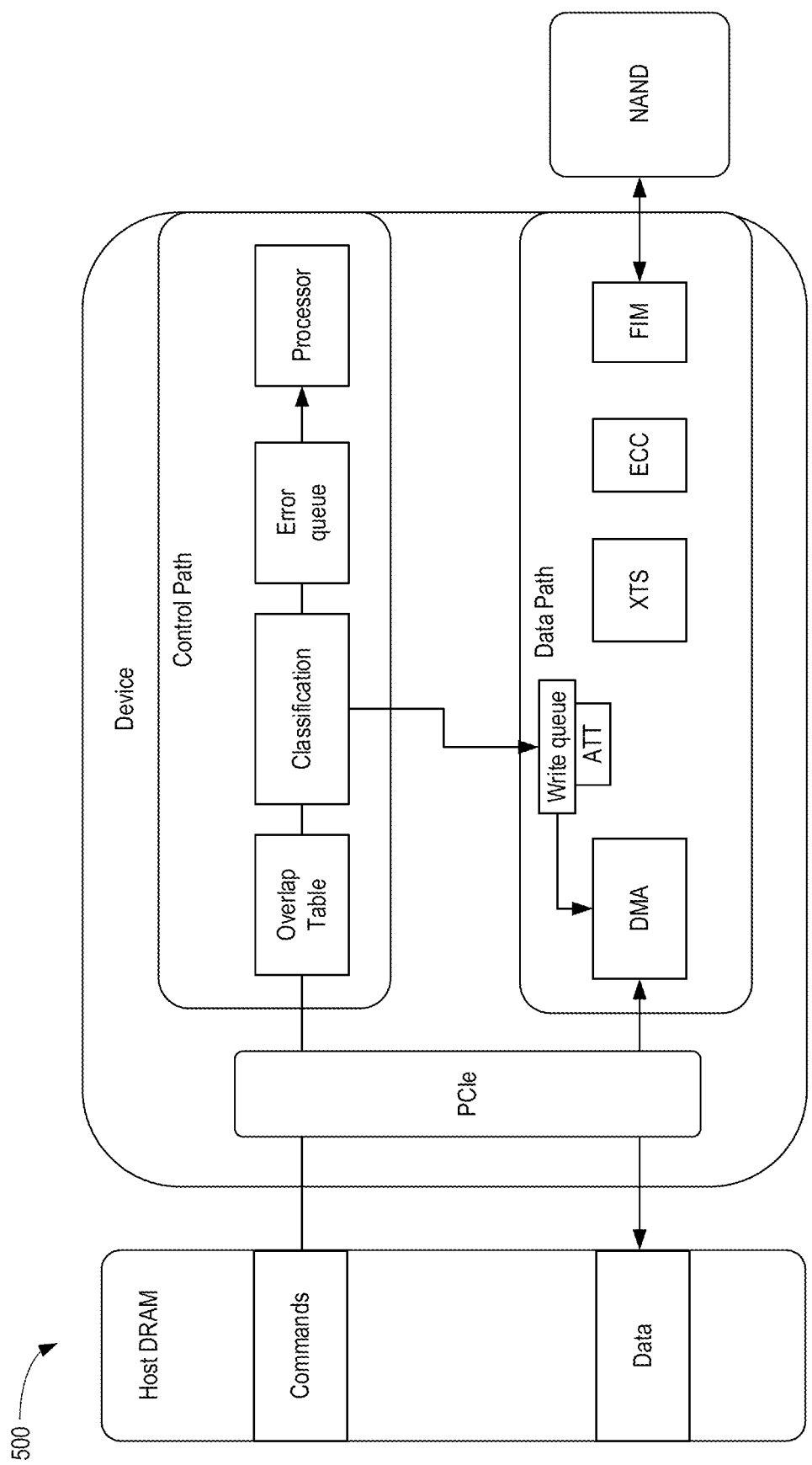
FIG. 5 is a block diagram illustrating a system for a write protect (WP) flow and a read command flow, according to certain embodiments.

FIG. 5 is a block diagram illustrating a system 500 for a WP flow and a read command flow, according to certain embodiments. The system 500 comprises a host DRAM, a device (controller) and a NAND. The host DRAM comprises a commands module and data. The device comprises a PCIe, a control path, and a data path. The control path further comprises an overlap table, a classification module, an error queue, and a processor. The data path further comprises a write queue that receives data form the classification module, a DMA, an XTS engine, an ECC module, and a FIM.

The write queue is now enhanced to contain one extra attribute, a WP attribute. The write queue already holds different attributes of the command (FUA, length, and 'normal overlap'). As such the path exists, and would benefit with a small enhancement. In addition, the classification process should be configured to send any write (even if the write overlaps the WP area) to the write-queue. When the DMA executes a command with "ATT:WP" (i.e., write protect attribute), the command is executed normally, ignoring the WP attribute. When the controller is done executing the command, the controller will report the command has completed with an error.

Figure 6:
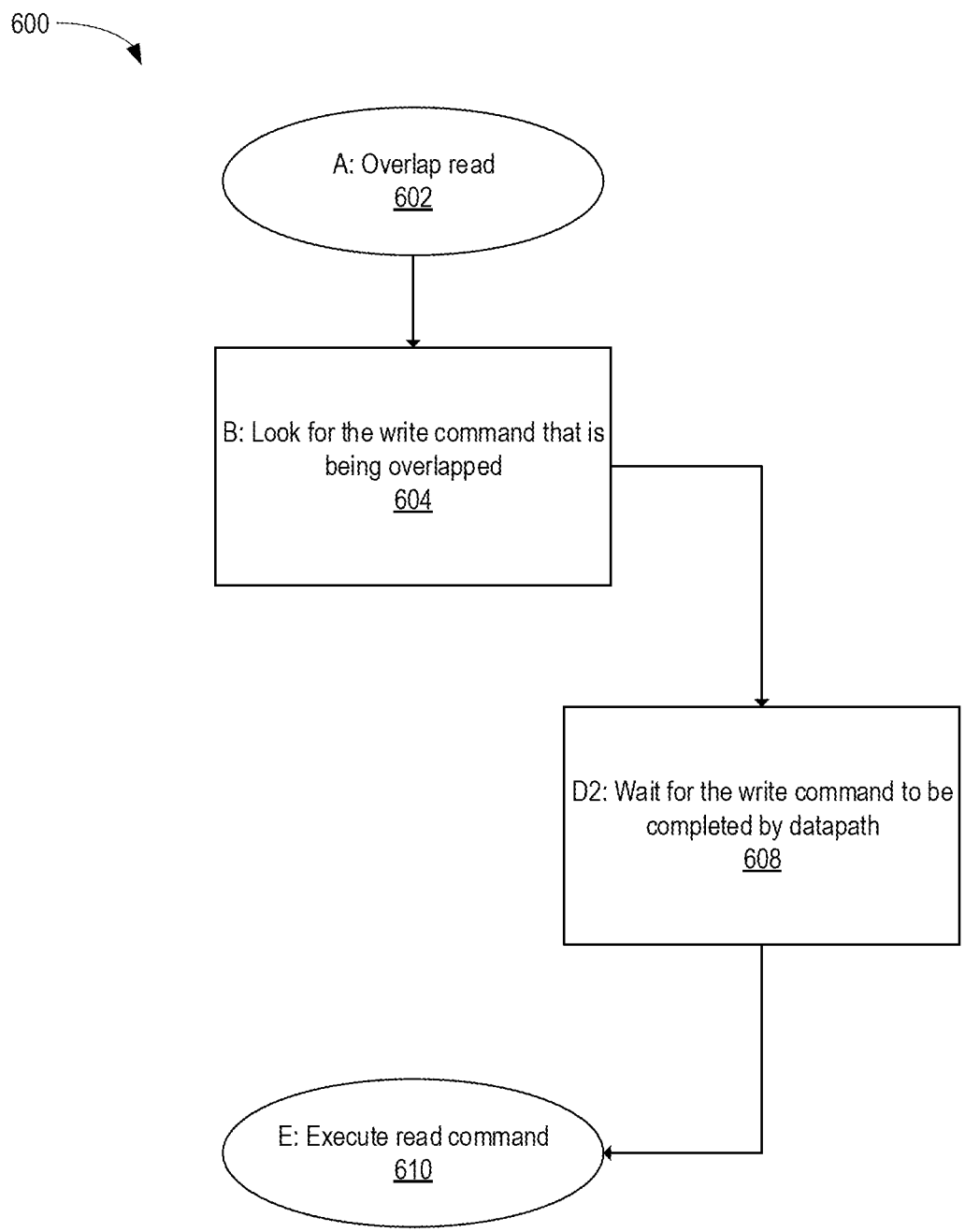
FIG. 6 is a flowchart illustrating a method for a command completed with an error, according to certain embodiments.

FIG. 6 is a flowchart illustrating a method 600 for a command completed with an error, according to certain embodiments. When the FW sees the command completed with an error, the FW knows to send error completion to the host. This is an existing flow since there could be other types of errors during the execution of the command. When the hardware (HW) completed the command, the HW will remove the command from the overlap table. Removing the command from the overlap table results to unblocking the execution of the read command.

The method 600 begins at block 602 (step A). At block 602, an overlap read is received by the controller. At block 604 (step B), the controller looks for the write command that is being overlapped. The firmware (FW) looks to understand which command is being overlapped. At block 608 (step D2), the controller will wait for the write command to be completed by data path. At block 610 (step E), the controller will execute the read command.

Figure 7:
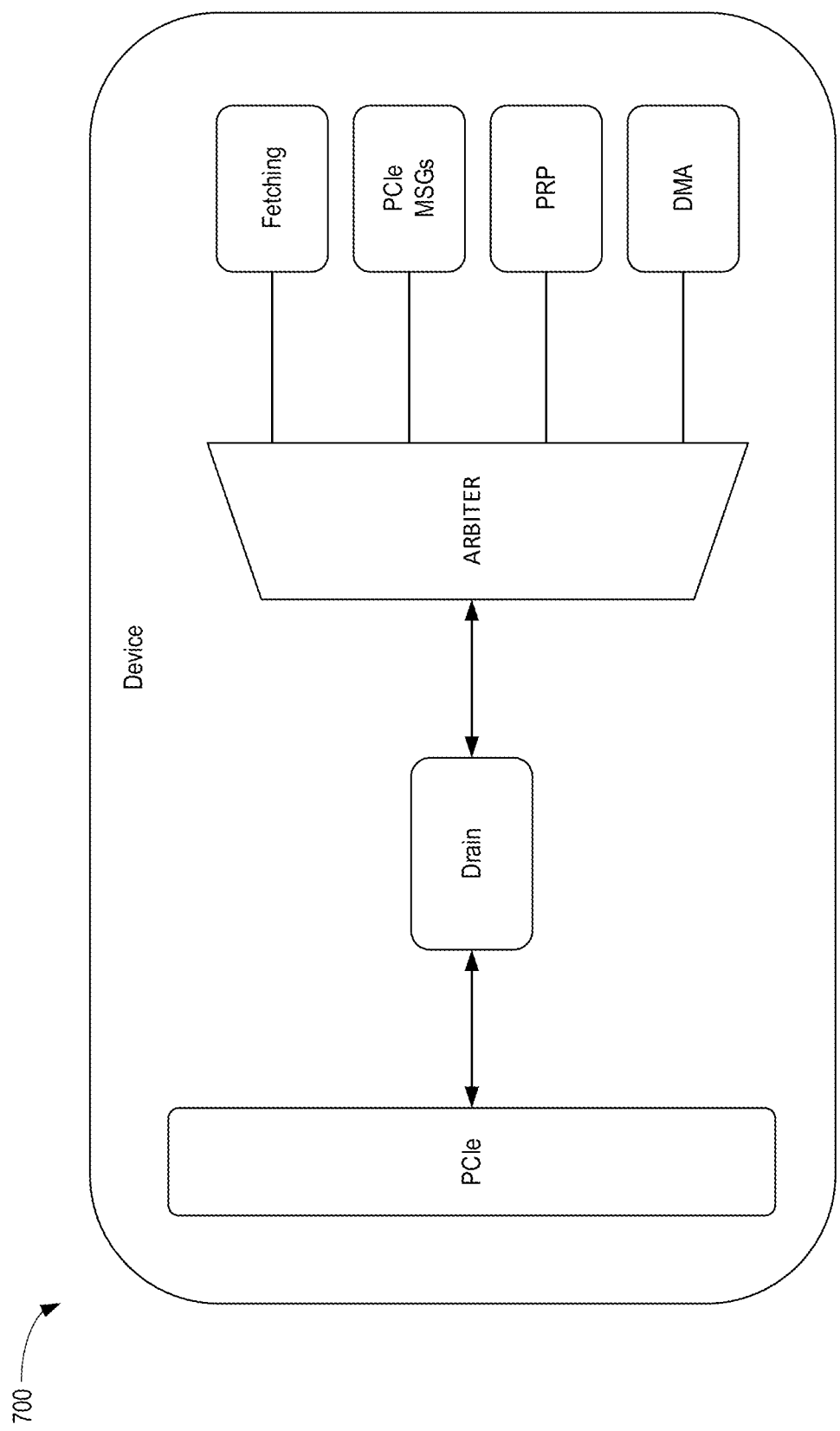
FIG. 7 is a block diagram illustrating a system for utilizing a drain module, according to certain embodiments.

FIG. 7 is a block diagram illustrating a system 700 for utilizing a drain module, according to certain embodiments. Due to the listed flows and other flows the device can behave normally. Instead of a command going to the PCIe, the command will stop at the drain module. For the parts of the device that is writing to the host will remain at the drain module because the command is a write command. The system 700 is reading that, but will not actually read the data. Instead the data will not go out on the PCIe but will remain internally at the drain module. Though, the rest of the system 700 will believe the command is executed but will be released to the overlap table. The system 700 can operate with the drain module or without the drain module. This allows the write to the WP range to be executed normally so that the FW doesn't have to handle write commands manually.

The system 700 comprises a device and the device further comprises a PCIe, a drain module and arbiter, a fetching module, a PCIe messages, a parallel redundancy protocol (PRP), and a DMA. There are multiple functionalities that attempt to access the PCIe. The device might include the DMA responsible for data transfer. The PRP management is responsible for pointers fetching, command fetching, sending completions, and host memory buffer (HMB) traffic.

Once an arbiter selects which request is to be processed, the request will pass through the drain module. The drain module is aware of the PCIe state (i.e RESET, link down, etc. . . . ) and based on the state the drain module determines whether the transaction goes on to the MAC, or if the transaction ends at the drain module. A write to a WP range command, the WP attribute can propagate together with the data transfer request, through the arbiter to the drain module. When the drain module sees the WP attribute, the drain module will not pass the specific request to the PCIe, and the drain module will consume the specific request.

By allowing write to WP range to go through the data path, and marking the execution of the write command with an error, the FW is simplified for both this case and the "normal" case of overlap-read commands. Furthermore, allowing for a simpler, and less bug-potential (and less development time) solution.

In one embodiment, a data storage device comprises: a memory device; and a controller coupled to the memory device, wherein the controller is configured to: retrieve an overlap read command; look for a write command that is overlapped with the read command; wait for the write command to be completed by a data path; and execute the read command. The controller comprises the data path and a control path, and wherein a write queue is disposed in the data path. The control path includes an overlap table, a classification module, an error queue, and a processor. The data path includes a direct memory access (DMA) module, the write queue, and a flash interface module (FIM). The write queue includes a write protect attribute. The classification module is coupled to the write queue. The write command has a write protect attribute. The controller is configured to return an error message after executing the write command. The controller is configured to remove the write command from a queue and from an overlap table. The read command is blocked from execution until completion of the write command. The controller comprises: a drain module; an arbiter module coupled to the drain; a fetching module coupled to the arbiter module; and a direct memory access (DMA) module coupled to the arbiter module. The drain module is configured to: determine that the write command has a write protect attribute; and consume a plurality of data transfers associated with the write command.

In another embodiment, a data storage device comprises: a memory device; and a controller coupled to the memory device, wherein the controller includes: a control path having an overlap table, a classification module, an error queue, and a processor; and a data path having a direct memory access (DMA) module, a write queue having a write protect attribute, and a flash interface module (FIM), wherein the data path is configured to complete write commands and remove write commands from the overlap table. The controller further comprises a drain module configured to consume a plurality of data transfers for write commands having write protect attributes listed in the overlap table. The plurality of data transfers includes the write protect attribute. The controller is configured to pause a read command that overlaps with a write command listed in the overlap table. The classification module is configured to send all write commands to the write queue.

In another embodiment, a data storage device comprises: means to store data; and a controller coupled to the means to store data, wherein the device is configured to: execute a write command with a write protect attribute; report the write command is completed with an error; remove the write command from an overlap table; and unblock execution of a read command. The controller has a data path and a control path, wherein the removing occurs in the data path, and wherein the overlap table is disposed in the control path. The reporting it to a drain module and wherein the drain module consumes a plurality of data transfer.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device; and
a controller coupled to the memory device, wherein the controller comprises a data path and a control path, wherein a write queue is disposed in the data path, and the controller is configured to:
retrieve a read command;
look for a write command that is overlapped with the read command;
determine whether the write command has a write protect attribute;
execute the write command having the write protect attribute, wherein executing the write command having the write protect attribute comprises passing the write command having the write protect attribute to the data path;
after executing the write command having the write protect attribute:
return an error message; and
execute the read command; and
remove the write command having the write protect attribute from the write queue and an overlap table.
2. The data storage device of claim 1, wherein the control path includes an overlap table, a classification module, an error queue, and a processor.

3. The data storage device of claim 2, wherein the data path includes a direct memory access (DMA) module, the write queue, and a flash interface module (FIM).

4. The data storage device of claim 3, wherein the write queue includes a write protect attribute.

5. The data storage device of claim 3, wherein the classification module is coupled to the write queue.

6. The data storage device of claim 1, wherein the read command is blocked from execution until completion of the write command.

7. The data storage device of claim 1, wherein the controller comprises:
   a drain module;
   an arbiter module coupled to the drain;
   a fetching module coupled to the arbiter module; and
   a direct memory access (DMA) module coupled to the arbiter module.

8. A data storage device, comprising:
   a memory device; and
   a controller coupled to the memory device, wherein the controller includes:
      a control path having an overlap table, a classification module, an error queue, and a processor; and
      a data path having a direct memory access (DMA) module, a write queue having a write protect attribute, and a flash interface module (FIM), wherein the data path is configured to:
         execute at least one write command of a plurality of write commands, wherein the at least one write command has a write protect attribute, wherein after executing the at least one write command the data path is further configured to:
         return an error message;
         send an error completion associated with the at least one write command to a host device;
         remove the at least one write command from the overlap table; and
         execute a read command, wherein the at least one write command overlaps with the read command and an execution of the read command was paused until the execution of the at least one write command.

9. The data storage device of claim 8, wherein the controller further comprises a drain module configured to consume a completion notification for write commands having write protect attributes listed in the overlap table, wherein consuming the completion notification comprises passing a write command having a write protect attribute to the data path instead of an exception queue.

10. The data storage device of claim 9, wherein the completion notification includes the write protect attribute.

11. The data storage device of claim 8, wherein the controller is configured to pause a read command that overlaps with a write command listed in the overlap table.

12. The data storage device of claim 8, wherein the classification module is configured to send all write commands to the write queue.

13. A data storage device, comprising:
   means to store data; and
   a controller coupled to the means to store data, wherein the controller is configured to:
      execute a write command with a write protect attribute; and
      after executing the write command:
         report the write command as completed with an error;
         remove the write command from an overlap table; and
         unblock execution of a read command, wherein the write command overlaps with the read command and an execution of the read command was blocked until the execution of the write command.

14. The data storage device of claim 13, wherein the controller has a data path and a control path, wherein the removing occurs in the data path, and wherein the overlap table is disposed in the control path.

15. The data storage device of claim 14, wherein the reporting is to a drain module and wherein the drain module consumes the reported completion, wherein consuming the reported completion comprises passing a write command having a write protect attribute to the data path instead of an exception queue.

* * * * *